Oct. 23, 1945. G. TILLMAN 2,387,623
SANITARY SUGAR BOWL AND EXTRACTOR
Filed May 3, 1944
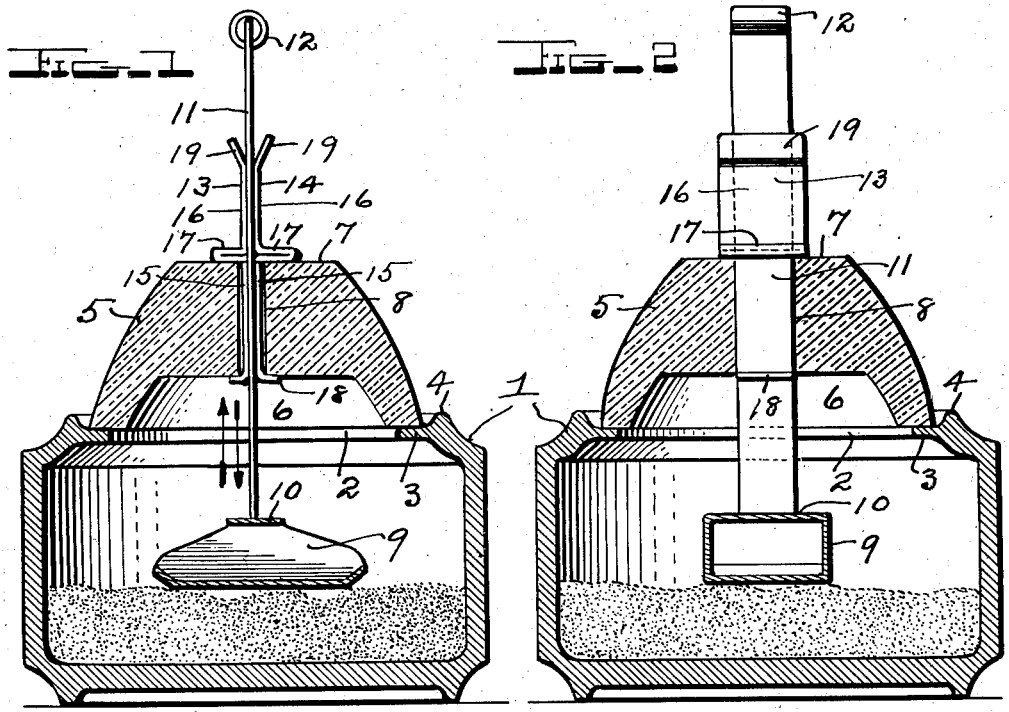
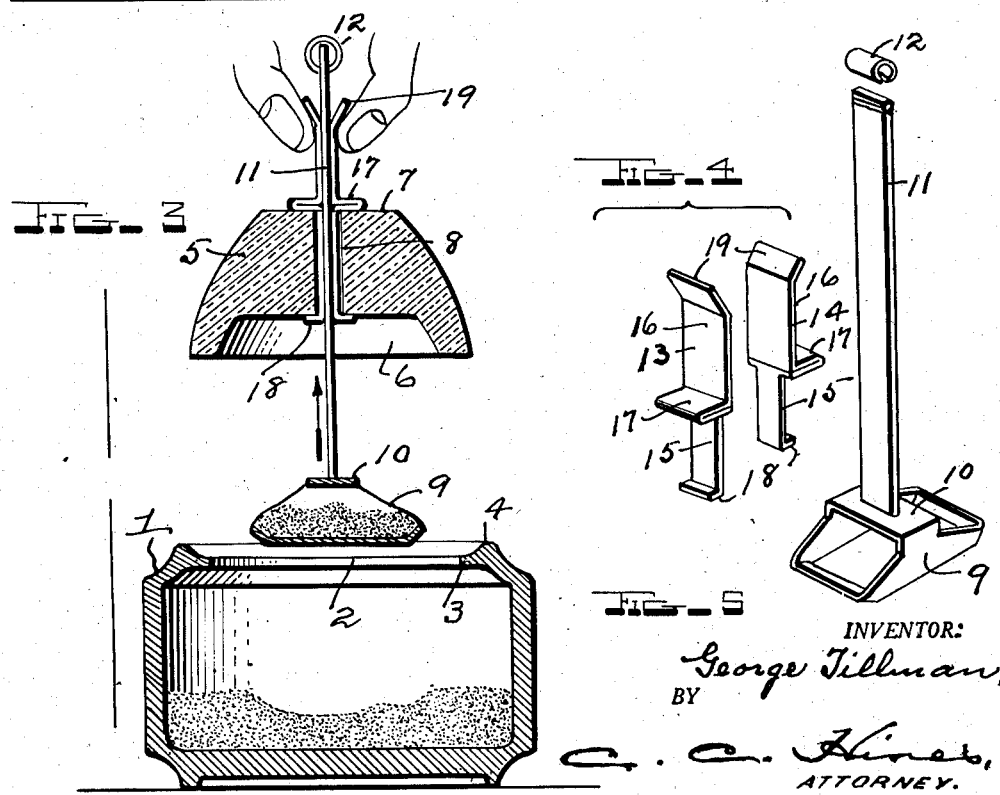
INVENTOR:
George Tillman,
BY
C. C. Hines,
ATTORNEY.

Patented Oct. 23, 1945

2,387,623

UNITED STATES PATENT OFFICE 2,387,623

SANITARY SUGAR BOWL AND EXTRACTOR

George Tillman, Kingsville, Tex.

Application May 3, 1944, Serial No. 533,993

8 Claims. (Cl. 65—59)

This invention relates to a sanitary sugar bowl and extractor for removing the sugar therefrom, and one of the objects of the invention is to provide a bowl in which sugar may be stored and from which portions of sugar may be removed from time to time in such manner as to keep the interior of the bowl and its contents in a cleanly and sanitary condition.

Another object of the invention is to provide a sugar bowl having a removable lid or cover and extractor mounted thereon and movable therewith so as to be applied and removed with the lid, whereby separate handling of the lid and extractor in bowl closing and opening operations and sugar removing actions is rendered unnecessary.

Still another object of the invention is to provide a construction of cover and extractor whereby the bowl may be kept constantly closed between sugar removing periods and in which the extractor serves as a handle for use in manipulating the lid and whereby in the operation of removing the lid the extractor may be operated to extract a desired quantity of sugar from the bowl.

Still another object of the invention is to provide an extractor which may be adjusted or moved relatively to the applied lid to dip up sugar from the stored supply and which may be conveniently detached from the lid so that the lid and extractor may be readily cleaned whenever desired or required.

Still another object of the invention is to provide a transparent lid allowing the contents of the bowl and movements of the extractor for a dipping operation to be observed while the lid is in place.

With these and other objects in view, the invention consists in the novel construction, combination and arrangement of parts hereinafter fully described and claimed, and as shown in the accompanying drawing, in which:

Fig. 1 is a vertical section through a bowl, lid and extractor embodying my invention and showing the extractor in one of its normal positions.

Fig. 2 is a similar section taken, with respect to the lid and extractor, at right angles to that shown in Fig. 1.

Fig. 3 is a view similar to Fig. 1, showing the lid and extractor removed and illustrating a sugar extracting operation of the extractor.

Fig. 4 is a perspective view of the extractor with the retaining member detached therefrom.

Fig. 5 is a perspective view of the extractor detached from the lid and with its retaining member detached therefrom and disposed in position for application thereto.

Referring now more particularly to the drawing, 1 designates a sugar bowl of a desired size and form and made of any suitable material, said bowl having at its top a filling and extracting opening 2 marginally bounded by a lid supporting flange or surface 3 surrounded at its upper side by a lid retaining flange 4. The opening 2 is of suitable size to allow the bowl to be readily and conveniently filled with sugar and to also allow ready removal of portions of the sugar by means of the extractor hereinafter described.

A removable lid or cover 5 is provided for normally closing the opening 2 and preventing entrance of dust, dirt and other foreign elements into the bowl and contamination of the sugar therein. This lid or cover may be of any suitable form, that shown being somewhat dome-shaped and having a cavity 6 in its underside, a flat top 7 and a slot 8 extending vertically through it between said cavity and flat top. The lid when applied rests at its base on the flange 3 and is held in position thereon and against outward sliding movement or displacement by the flange 4. The bowl may be made of opaque, transparent or translucent material. The lid is preferably made of transparent material so that the interior of the bowl and its contents viewed therethrough and the movements of the extractor in an extracting operation observed to guide the operator in taking up and extracting a desired amount of sugar.

The extractor referred to comprises a dipper, spoon or scoop-like gathering receptacle 9 which is open at each end for the gathering therein and discharge therefrom of portions of sugar. Extending across the top of this scoop is a bridgepiece 10 to which is rigidly secured the lower end of a handle or shank 11. This handle or shank is in the form of an elongated strip of metal or other material which extends through the slot 8 in the lid so as to project both above and below the lid when applied to the latter for use. At its upper or outer end the handle is grooved to receive and interlock with the edges of a split, resilient tubular retaining member 12 which forms a stop to normally limit the downward movement of the handle and prevent casual displacement of the extractor from the lid and also serves as a fingerpiece adapting the extractor to be raised and lowered, as hereinafter described.

Carried by the lid is a clip or gripper comprising a pair of spring metal clamping plates or members 13 and 14. Each of these is formed of a strip doubled or folded upon itself to provide a lower limb portion 15, an upper limb portion 16 and a flange portion 17. As shown, the limb portions 15 of the members 13 and 14 are of a length to fit within the slot 8 so that the flanges 17 may rest on the lid surface 7 to hold the members 13 and 14 from downward movement in the slot 8. The limb portions 15 are provided with outbent retaining flanges 18 to engage the lid at opposite sides of the slot to hold the gripper members from upward displacement when the parts are assembled for use, as shown in Figs. 1, 2 and 3, and the limb portions 16 are provided with abutment portions 19 bent outwardly at an angle thereto to adapt the extractor to be clamped to the lid and the lid and extractor handled as a unit in removing a gathered amount of sugar from the bowl.

When the parts are in assembled condition the handle 11 of the extractor extends between and above and below the gripper members 13 and 14 and lies in frictional engagement therewith. This frictional engagement may be sufficient to hold the extractor in any position which it may occupy at the time, for example, a position in which the scoop 9 is elevated above the body of sugar in the bowl, or the frictional engagement may be slight enough to allow the extractor to slip down by gravity with the scoop 9 resting on the body of sugar and so that the scoop will descend as the level of the sugar is lowered and always rest thereon. By means of the finger piece 12 or by gripping the upper end of the handle 11, however, the operator may raise or lower the extractor to dispose the scoop 9 in a proper working position for removal of a portion of sugar. If the scoop is at too high a level, a convenient way of depressing it is for the operator to grip the gripper portions lightly between the thumb and middle finger of the hand and then exert pressure by means of the forefinger on the finger piece 12 to force the extractor downward. As above described, the extractor may be raised whenever required to lift the scoop from a low level to a higher level. It will be observed that the gripper members are loosely fitted in the slot 8 so that they may have a certain degree of sliding movement toward or from each other. By this means they are adapted to be applied and removed in the manner hereinafter described when the extractor is detached to allow these parts to be easily and quickly assembled for use or disassembled for thorough cleaning or for repairs.

In the operation of extracting a portion of sugar with the lid in closed position and the scoop resting on or disposed at any level above the body of sugar in the bowl, the scoop is forced down into the sugar to the degree desired to take up a certain amount of sugar, the limbs 16 of the gripper members then are gripped by the operator to clamp the extractor against movement relative to the lid, and the lid and extractor then lifted free of the bowl top and manipulated to dump the sugar from the scoop into a cup or other receptacle. In the operation of taking up sugar from the bowl the lid may be tilted or rocked on the flange 3 to dispose the scoop at an angle and thereby facilitate the taking up of the sugar to the amount desired. If the bowl or lid is made of transparent material, the dipping operation may be observed so that an exact amount may be taken up on each dip.

In applying the gripper and extractor to the lid, one of the gripper members is first inserted from above down through slot 8 and its flanges 17 and 18 brought into engagement with the top wall of the cavity 6 and the surface 7, after which the other gripper member is similarly fitted in position, the shank or handle 11 of the extractor inserted from below upwardly between the gripper members, and the retainer 12 then applied. In the operation of removing these parts for cleaning or repairs, the retainer 12 is detached, the extractor moved downwardly to withdraw it, and the gripper members successively removed. As stated, the gripper members, in the absence of the handle 11 of the extractor, fit somewhat loosely in the slot 8. This allows sufficient lateral movement and tilting of the gripper members to clear their flanges 18 and adapt them to be successively removed or applied one after the other without interference with each other.

From the foregoing description, taken in connection with the drawing, the construction and mode of use of my improved sugar bowl and extractor will be readily understood, and it will be seen that the extractor constitutes a part of the bowl structure and is normally in position for use and avoids the use of separate spoons by separate persons in extracting portions of sugar for use. Also it will be seen that the bowl is closed at all times except during the withdrawal of a portion of sugar, and that the sugar contents and scoop are normally inclosed and protected against the access thereto and contact therewith of flies or other insects and dust, dirt and other contaminating substances. The construction, furthermore, avoids the necessity of the separate handling of the lid and an extractor in an extracting operation and the use of spoons which may not be clean. Another advantage is that a common practice of removing the lid and resting it on the table while a spoon is being used, with the attendant liability of the return of the lid being forgotten and the bowl left uncovered, is prevented and such liability reduced to a material degree.

While the construction disclosed is preferred, it is to be understood that changes in the form, proportion and arrangement of parts may be made, within the scope of the appended claims, without departing from the spirit or sacrificing any of the advantages of the invention.

Having thus described my invention, I claim:

1. A sugar bowl having a filling and extracting opening, a lid for closing the opening, and a sugar extractor carried by the lid and comprising a scoop open at each end and having upwardly extending side walls, a bridge piece connecting the upper ends of said side walls centrally of the scoop, and a handle connected to the bridge piece and projecting outwardly through and slidably mounted in the lid.

2. A sugar bowl having a filling and extracting opening, a lid for closing the opening, said lid having an opening therein, and a sugar extractor disposed beneath the lid and comprising a scoop having a handle connected at its inner end therewith and extending outwardly through and slidably mounted in the opening in the lid, and clamping members disposed in the lid opening on opposite sides of the handle and having operating portions projecting therefrom above the lid and manually operable to adjust said clamping members for handle clamping and releasing actions.

3. A sugar bowl having a filling and extracting opening, a lid for closing the opening, said lid having an opening therein, and a sugar extractor disposed beneath the lid and having a handle extending outwardly through and slidable in the opening in the lid, clamping members disposed in the opening in the lid on opposite sides of the handle and movable toward and from each other and into and out of clamping engagement with the handle to hold the extractor from sliding movement or release it for sliding movement relative to the lid and operating members projecting from the clamping members and lying beyond the lid on opposite sides of the handle and adapted to be manipulated to effect movement of the clamping members into and out of clamping position.

4. A sugar bowl having a filling and extracting opening, a lid for closing the opening, said lid having an opening therein, and a sugar extractor disposed beneath the lid and having a handle extending outwardly through and slidably mounted in the opening in the lid, clamping members having portions disposed in the opening in the lid on opposite sides of the handle and movable into and out of clamping engagement therewith and portions projecting outwardly beyond the lid and lying on opposite sides of the handle and adapted to be operated to move the clamping members into and out of clamping position, and a stop detachably mounted on the outer end of the handle for engagement with the clamping members to normally limit the inward sliding movement of the handle and adapted upon removal to permit inward sliding withdrawal of the handle from the lid.

5. A sugar bowl having an opening, a removable lid for closing the opening, a dipper having a shank extending through and slidably mounted in the lid, and gripper means comprising a pair of relatively movable clamping members for engagement with the shank therebetween in any of its positions of adjustment relative to clamp the shank to the lid.

6. A sugar bowl having an opening, a removable lid for closing the opening, said lid having a vertical slot extending therethrough, a dipper disposed beneath the lid and having a shank extending therefrom upwardly and slidably through the slot in the lid, clamping members on the lid and held within said slot for holding the shank fixed with relation to the lid, and manually operable projections from the clamping members extending above the lid whereby said members may be operated for clamping and releasing actions.

7. A sugar bowl having an opening, a removable lid for closing the opening, said lid having a vertical slot extending therethrough, a dipper disposed beneath the lid and having a shank extending therefrom upwardly slidably through the slot in the lid, and clamping members on the lid removably mounted in the slot and adapted to operate to grip and hold the shank in fixed relation to the lid.

8. A sugar bowl having an opening, a removable lid for closing the opening, said lid having a vertical slot extending therethrough, a dipper disposed beneath the lid and having a shank extending therefrom upwardly slidably through the slot in the lid, grippable clamping members on the lid and disposed within the slot and operable to hold the shank fixed with relation to the lid, and detachable retaining means at the upper end of the shank to engage the clamping members and normally limit the downward movement of the shank.

GEORGE TILLMAN.